United States Patent
Yang et al.

(10) Patent No.: US 11,555,658 B2
(45) Date of Patent: Jan. 17, 2023

(54) METHODS AND SYSTEMS TO CONVERT PASSIVE COOLING TO ACTIVE COOLING

(71) Applicant: University of Alaska Anchorage, Anchorage, AK (US)

(72) Inventors: Zhaohui Yang, Anchorage, AK (US); Simon Evans, Girdwood, AK (US); Gregory McConnell, Eagle River, AK (US)

(73) Assignee: University of Alaska Anchorage, Anchorage, AK (US)

( * ) Notice: Subject to any disclaimer, the term of this patent is extended or adjusted under 35 U.S.C. 154(b) by 0 days.

(21) Appl. No.: 14/946,210

(22) Filed: Nov. 19, 2015

(65) Prior Publication Data
US 2016/0223270 A1 Aug. 4, 2016

Related U.S. Application Data

(60) Provisional application No. 62/081,844, filed on Nov. 19, 2014.

(51) Int. Cl.
| | |
|---|---|
| *F28D 20/00* | (2006.01) |
| *F28D 15/00* | (2006.01) |
| *F24T 10/15* | (2018.01) |
| *F24T 10/17* | (2018.01) |
| *F24T 10/40* | (2018.01) |

(52) U.S. Cl.
CPC .......... *F28D 20/0052* (2013.01); *F24T 10/15* (2018.05); *F24T 10/17* (2018.05); *F24T 10/40* (2018.05); *F28D 15/00* (2013.01); *Y02E 10/10* (2013.01); *Y02E 60/14* (2013.01)

(58) Field of Classification Search
CPC ... F24J 3/083; F24J 3/084; F24J 3/086; F28D 15/00; F28D 20/0052; Y02E 10/125; Y02E 10/16; Y02E 60/142
See application file for complete search history.

(56) References Cited

U.S. PATENT DOCUMENTS

| | | | | | |
|---|---|---|---|---|---|
| 2,425,826 | A | * | 8/1947 | Radtke | ........................ F28F 3/12 165/77 |
| 3,613,792 | A | * | 10/1971 | Hyde | ...................... E21B 33/10 166/302 |

(Continued)

FOREIGN PATENT DOCUMENTS

JP 61176684 A * 8/1986

OTHER PUBLICATIONS

JP 61-176684 A machine translation.*

*Primary Examiner* — Gordon A Jones
(74) *Attorney, Agent, or Firm* — Ballard Spahr LLP (57) ABSTRACT

Provided are methods and systems for converting a passive cooling system into an active hydronic ground cooling system. In an aspect, an existing passive cooling device can be first discharged of working fluid. An existing pipe of the passive cooling system can then be cut to a predetermined height. A top portion of the existing pipe can be threaded and fitted with a cap base. Tubing can then be installed within the existing pipe. A cap can be attached to the cap base. The tubing can be attached to a chiller system and filled with coolant. Similar procedure can be applied to convert a thermopile or traditional pipe pile to into an active cooling system.

12 Claims, 6 Drawing Sheets

(56) References Cited

U.S. PATENT DOCUMENTS

| | | | | | |
|---|---|---|---|---|---|
| 3,648,767 | A * | 3/1972 | Balch | | F24T 10/30 165/104.19 |
| 3,766,985 | A * | 10/1973 | Willhite | | E21B 36/003 166/302 |
| 3,823,769 | A * | 7/1974 | Anderson | | F28D 15/04 165/76 |
| 3,880,236 | A * | 4/1975 | Durning | | E21B 36/003 166/302 |
| 3,882,937 | A * | 5/1975 | Robinson | | E21B 36/003 166/267 |
| 4,036,286 | A * | 7/1977 | Anderson | | E02D 3/115 165/45 |
| 4,111,258 | A * | 9/1978 | Jahns | | E02D 3/115 165/300 |
| 8,079,420 | B2 * | 12/2011 | Alexandersson | | E21B 33/10 166/387 |
| 8,343,579 | B2 * | 1/2013 | Gillanders | | B05D 3/12 427/238 |
| 8,443,794 | B2 * | 5/2013 | Hulen | | E01C 11/26 126/623 |
| 9,121,393 | B2 * | 9/2015 | Schwarck | | F03G 7/04 |
| 2006/0107664 | A1 * | 5/2006 | Hudson | | F28D 20/0056 60/659 |
| 2008/0053130 | A1 * | 3/2008 | Mueller | | F24F 5/0046 62/260 |
| 2009/0110540 | A1 * | 4/2009 | Bywaters | | F03D 13/22 415/47 |
| 2009/0281668 | A1 * | 11/2009 | Nesler | | B09C 1/02 700/276 |
| 2010/0089391 | A1 * | 4/2010 | Addie | | F24S 60/00 126/617 |
| 2010/0305918 | A1 * | 12/2010 | Udell | | F24T 10/10 703/2 |
| 2011/0247348 | A1 * | 10/2011 | Mashiko | | H05K 7/2079 62/62 |
| 2012/0255706 | A1 * | 10/2012 | Tadayon | | F28D 20/0039 165/47 |
| 2012/0285657 | A1 * | 11/2012 | Rudolf | | F24T 10/15 165/45 |
| 2013/0062065 | A1 * | 3/2013 | Macadam | | E21B 36/02 166/302 |
| 2013/0068418 | A1 * | 3/2013 | Gotland | | F28D 19/00 165/45 |
| 2013/0153399 | A1 * | 6/2013 | McAlister | | F28D 15/02 203/25 |
| 2013/0312957 | A1 * | 11/2013 | Grimes | | E21B 43/2401 166/248 |
| 2014/0074314 | A1 * | 3/2014 | Niknafs | | G05D 23/19 700/300 |
| 2015/0013370 | A1 * | 1/2015 | Wiggs | | F24T 10/15 62/260 |
| 2015/0021924 | A1 * | 1/2015 | Parella, Sr. | | F03G 7/04 290/1 R |
| 2015/0163965 | A1 * | 6/2015 | Parrella | | F01K 9/003 361/700 |

* cited by examiner

METHODS AND SYSTEMS TO CONVERT PASSIVE COOLING TO ACTIVE COOLING

CROSS REFERENCE TO RELATED PATENT APPLICATION

This application claims priority to U.S. Provisional Application No. 62/081,844 filed Nov. 19, 2014, herein incorporated by reference in its entirety.

BACKGROUND

Current passive cooling systems such as thermosyphons or thermopiles are primarily used in maintaining the integrity and stability of foundations in permafrost soils. The limitations of a passive cooling system include a maximum ground cooling capacity of about 3-5° C., and high construction costs. Additionally, the active layer thaws each season, increasing the seasonal cooling loads, and limiting the effectiveness of the system. In general, passive cooling systems rely on a temperature difference between the soil and the air to operate. With the occurrence of more extreme weather events in a changing climate, such systems may not be able to provide sufficient capacity for some ground cooling applications. In contrast, active cooling systems allow for control of the cooling cycles and more predictable results. The process eliminates the dependency on the weather, and can be programmed to function during the summer months when permafrost cooling is most beneficial.

SUMMARY

It is to be understood that both the following general description and the following detailed description are exemplary and explanatory only and are not restrictive. Provided are methods and systems for converting a passive permafrost foundation cooling system or a traditional pipe pile foundation into an active hydronic ground cooling system. In an aspect, for a thermosyphon passive cooling system, an existing pipe can be first discharged of its working fluid. The existing pipe can then be cut to a predetermined height, cleaned, and inspected for defects. The existing pipe can be pressure tested. The inside of the existing pipe can be coated with a corrosive prevention layer or a sealant layer to prevent corrosion. A top portion of the existing pipe can then be threaded and fitted with a custom fabricated cap base. Tubing and one or more supporting/centering spacers can then be installed within the existing pipe. A custom sealing cap can then be attached to the cap base. In an aspect, the tubing can be attached to a chiller system and filled with a glycol-based coolant, or other working fluid.

In another aspect, for a conventional pipe pile or a thermopile, a hole can be cut toward a top of an existing pipe. Through the hole, the inside of the existing pipe can be cleaned and inspected for defects. The inside of the existing pipe can be coated with a corrosive prevention layer or a sealant layer to prevent corrosion. A coolant loop comprising tubing can then be inserted via the hole until the coolant loop reaches a bottom of the existing pipe. In an aspect, the hole can be covered with a cap. In an aspect, the cap can be custom fabricated. In an aspect, the cap can be comprised of steel. The existing pipe can be filled with a thermally conductive media (e.g., silicone rubber) to facilitate a heat exchange between coolant and soil surrounding the pile. The hole can be sealed and the coolant tubing can be attached to a supply port and a return port of a chiller system. The chiller system can be filled with a glycol-based coolant, or other working fluid.

The conversion can provide a greater cooling capacity than an existing passive foundation cooling system, as well as control of the energy extracted from the frozen soil. The provided systems and methods can be powered by a photovoltaic solar power plant. The provided systems and methods can operate independently from about mid-March to late September in arctic and subarctic regions.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Provided are methods and systems for converting a passive permafrost foundation cooling system or a traditional pipe pile foundation into an active hydronic ground cooling system. In an effort to increase reliability for frozen foundations and other infrastructure developed at sites with permafrost, the conversion can maintain long-term stability of frozen soils. The active hydronic ground cooling system can provide a greater cooling capacity than an existing passive foundation cooling system, as well as control of the energy extracted from the frozen foundation system.

The disclosed methods can comprise the following steps. For a passive cooling system, an existing pipe can be first discharged of working fluid. The existing pipe of the passive cooling system can then be cut to a predetermined height, can be cleaned, and can be inspected for defects. The existing pipe can be pressure tested. The inside of the exiting pipe can be coated with a corrosive prevention layer or a sealant layer. A top portion of the existing pipe can then be threaded and fitted with a custom fabricated cap base. Tubing and one or more supporting/centering spacers can then be installed within an existing pipe. A custom sealing cap can be attached to the cap base. In an aspect, the tubing can be attached to a chiller system and filled with a glycol-based coolant, or other working fluid.

For a conventional pipe pile or a thermal pile, a hole can be cut toward a top of an existing pipe of the conventional pipe pile or thermal pile. Through the hole, the inside of the existing pipe can be cleaned and inspected for defects. For a passive cooling system, a top portion of a pipe can be threaded and fitted with a custom fabricated cap base. In an aspect, the inside of the existing pipe can be coated with a corrosive prevention layer or a sealant layer. A coolant loop comprising tubing can then be inserted until the coolant loop reaches the bottom of the existing pipe. The existing pipe can be filled with a thermally conductive media (e.g., silicone rubber) to facilitate a heat exchange between coolant and soil surrounding the pile. The hole can be sealed and the coolant tubing can be attached to a supply port and a return port of a chiller system. The chiller system can be filled with a glycol-based coolant, or other working fluid.

In an aspect, a low pressure cooling loop or loops can circulate refrigerant throughout an existing thermosyphon or thermopile structure. A supply line can provide a coolant to a first end and return on an opposite end of the first end of the existing thermosyphon or thermopile structure to allow for greater heat transfer. In an aspect, a closed loop tithing system can be installed within the conventional pipe pile or passive cooling system. In another aspect, a thermally conductive media can be placed within the annulus of the existing conventional pipe pile or thermopile structure to promote heat transfer between a closed loop cooling coil within the pile structure and the surrounding soil.

The active hydronic ground cooling system can eliminate the active layer of permafrost and maintain a frozen state of moisture within underlying permafrost. By maintaining the frozen state of the underlying permafrost, energy requirements are lessened by lowering the amount of the energy necessary for the phase change, from liquid to solid, of the moisture in the permafrost (latent heat of water).

The disclosed methods and systems can prevent ice-rich permafrost from awing in cold regions. The active hydronic ground cooling system can provide radiant cooling to underlying soil and thereby maintain short-term and long-term stability of frozen soil in a changing climate. In an aspect, the active hydronic ground cooling system can be installed in an existing passive cooling device. In cases where the moisture in the soil is frozen at the time of installation, the disclosed system can have a low power requirement, as no energy is required to freeze water into ice since the moisture is already in frozen status, and the disclosed system can be primarily driven by electricity produced from a photovoltaic power plant. By maintaining the frozen state of the soil, the energy requirement is limited to the heat sufficient to maintain a constant temperature. This can eliminate the latent heat associated with the phase change of the moisture in the soil and provides continuous subsurface structural stability of the soil.

In an aspect, the disclosed system can operate during periods of high solar radiation, rather than only during winter months when the air temperature is lower than the ground temperature. The disclosed system can provide cooling to permafrost subsurface prior to and/or during the periods when foundation degradation would normally occur. The disclosed system can prevent permafrost degradation in the vicinity of the foundation of interest in a proactive manner. The energy requirements of the active hydronic ground cooling system can be kept to a minimum by preventing the phase change of the moisture within soil. The active cooling system can be powered using renewable energy sources such as solar energy.

The active hydronic ground cooling system can be an improvement over existing passive cooling technologies in several aspects. In an aspect, the active cooling system can have a higher cooling capacity. In another aspect, there can be ample flexibility of system design and configuration allowing for modification of the active cooling system.

The disclosed system can be expanded and updated with locally available equipment. The disclosed system can be modular and relatively easy to transport to remote locations. The disclosed system can be applicable for new foundation construction and existing foundation rehabilitation. For example, in cases where existing foundations are subject to failure due to permafrost degradation, the disclosed system can be used to extend its useful lifespan due to the adaptability of installation process. Operating costs can be low and can generally involve routine maintenance.

This disclosed system can provide both short-term and long-term integrity and stability for foundations in warm permafrost sites. For example, the disclosed system can be applicable for infrastructure built on warm permafrost sites including but not limited to sewage tanks, drilling pads, wind turbine foundations, bulk fuel storage facilities, pipelines, utilidors, and energy transmission systems. The disclosed cooling system can allow for operational flexibility to compensate for environmental variability due to climate change or other detrimental forces.

Figure 1:
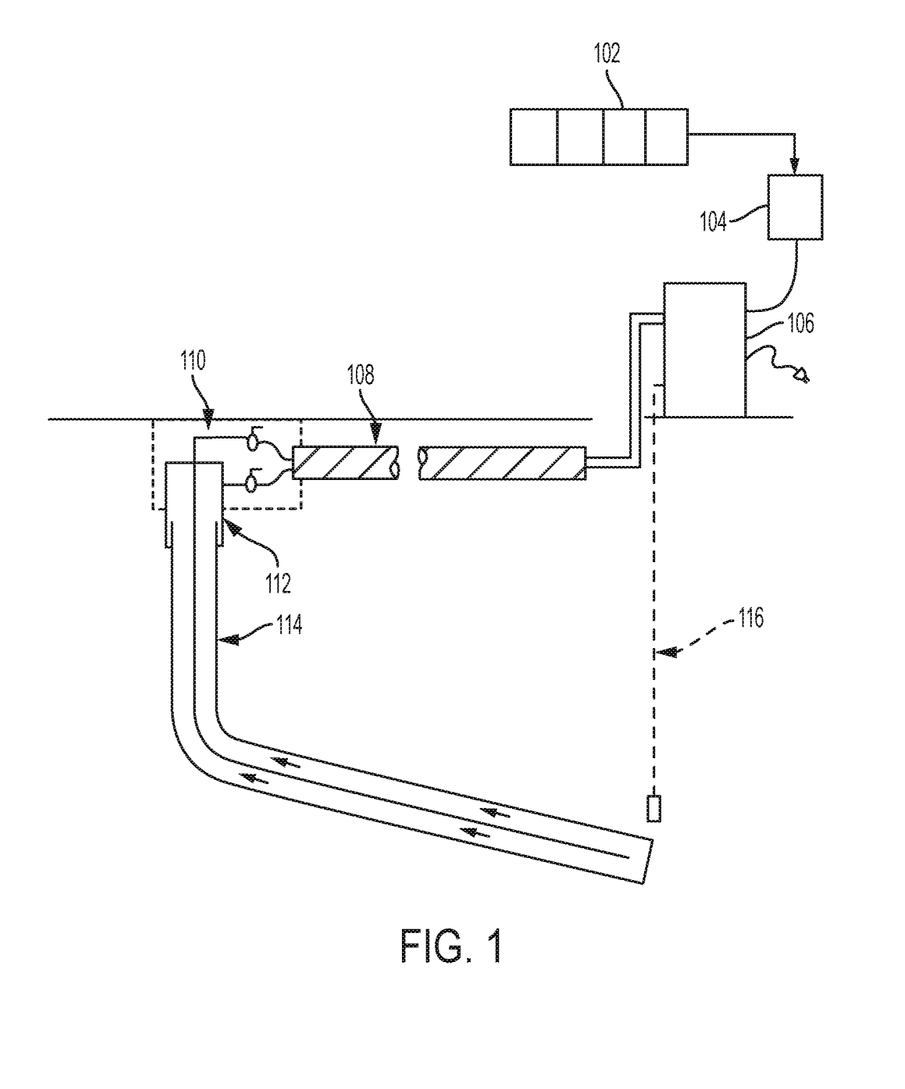
FIG. 1 illustrates a converted active cooling system based on an existing passive cooling system.

FIG. 1 illustrates a converted active cooling system based on an existing passive cooling device. The converted active cooling system can utilize a portion of the existing passive cooling infrastructure. The existing passive cooling system can comprise existing pipe 114. In an aspect, the existing pipe 114 can be a thermosyphon pipe. In an aspect, the existing pipe 114 can be cut off and fitted with a custom cap 112. In an aspect, the existing pipe 114 can be filled with a coolant supply. In an aspect, the converted active cooling system can comprise solar panels 102 and a solar power battery bank and an inverter 104. In an aspect, the converted active cooling system can comprise chiller system 106. In an aspect, the chiller system 106 can be a glycol chiller system. In an aspect, the chiller system 106 can be in communication with a temperature sensor 116. In an aspect, the converted active cooling system can comprise pipe 108. In an aspect, the pipe 108 can be preinsulated. In an aspect, the pipe 108 can be flexible. In an aspect, the converted active cooling system can comprise a removable insulation 110. In an aspect, the removable insulation 110 can comprise the custom cap 112. In an aspect, the converted active cooling system can comprise one or more return tubes. In an aspect, the existing pipe 114 can comprise the temperature sensor 116. The working fluid can be cooled by a chiller system 106 that can be powered by a multitude of power sources such as a solar power source 102 & 104, a conventional power source, or a combination thereof.

Figure 2:
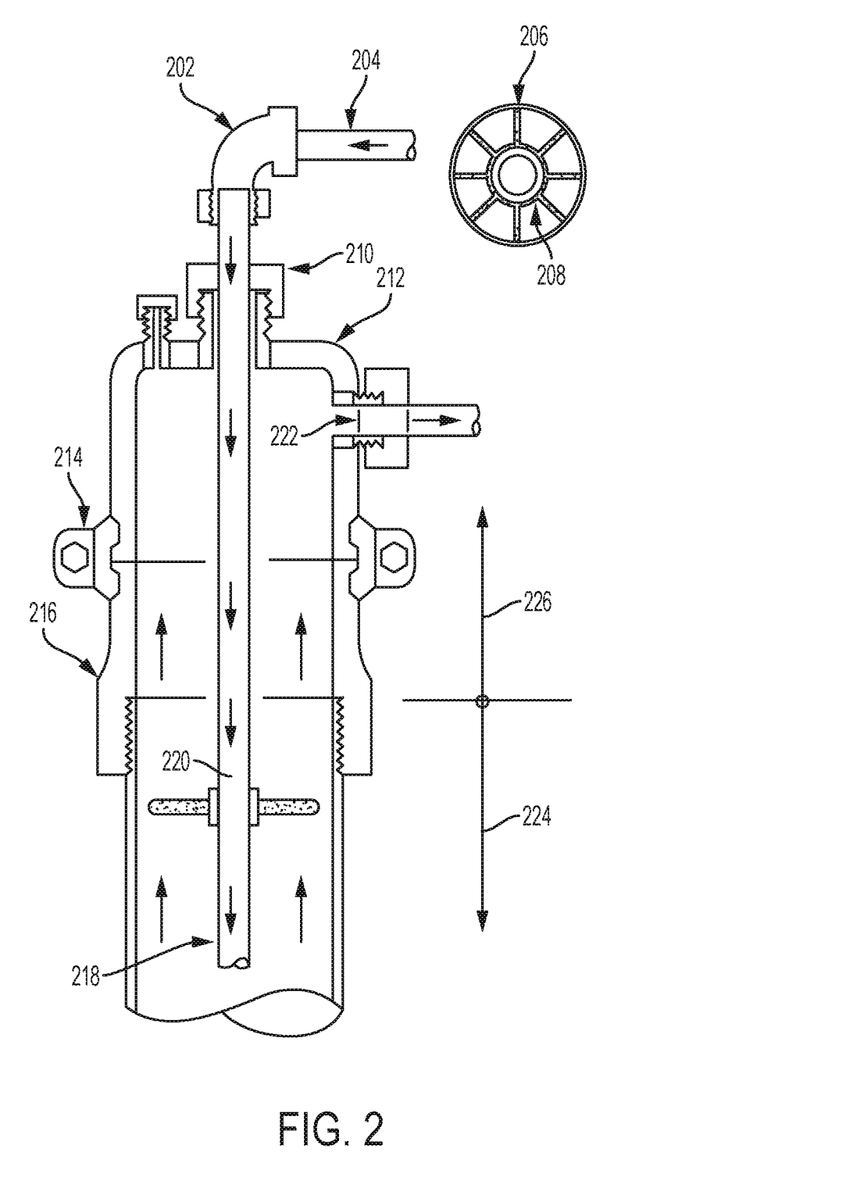
FIG. 2 illustrates a custom fitting to form a closed low-pressure coolant circulation system.

FIG. 2 illustrates a custom fitting to form a closed low-pressure coolant circulation system. In an aspect, the circulation system can comprise a 90 degree pex or compression fitting 202. In an aspect, the fitting 202 can comprise a tubing 204. In an aspect, the circulation system can comprise compression fitting 210. In an aspect, the circulation system can comprise a cap 212. In an aspect, the cap 212 (e.g., custom cap 112) can be a fabricated steel cap. In an aspect, the cap 212 can comprise a rigid grooved seal and coupling 214. In an aspect, the cap 212 can comprise a female threaded adapter 216. In an aspect, the cap 212 can comprise an existing pipe 206, 224. In an aspect, a top portion of the existing pipe 226 can be removed. In an aspect, a portion of the existing pipe 206, 224 can remain. In an aspect, the existing pipe 206, 224 can comprise new tubing 208, 218 with spider spacers. In an aspect, the existing pipe 206, 224 can be a thermosyphon pipe. In an aspect, the tubing 208, 218 can comprise a supply 220 (e.g., coolant, etc.). In an aspect, the cap 212 can comprise a return tube 222.

In an aspect, a condensing portion of an existing passive cooling system can be removed from an existing passive cooling pipe. Threads can then be grooved into an existing thermosyphon body 206, 224. The threaded portion of the existing thermosyphon body 206, 224 can be fitted with a cap base. In an aspect, the cap base can be custom fabricated. Coolant tubing 208, 218 and one or more supporting/centering spacers can be installed within the existing thermosyphon body 206, 224. A custom seating cap can then attached to the cap base. The coolant tubing 208, 218 can then be attached to a chiller system and the coolant tubing 208, 218 can be filled with coolant. In an aspect, the coolant can be glycol-based.

An example method for converting a conventional pipe pile to an active ground cooling system can comprise cutting a hole toward the top of an existing pipe. Through the hole, the inside of the existing pipe 206, 224 can be cleaned and inspected for defects, and the inside of the existing pipe 206, 224 can be coated with a corrosive prevention layer or a sealant layer. A coolant loop comprising coolant tubing 208, 218 can then be inserted via the hole until it reaches bottom of the existing pipe 206, 224. The existing pipe 206, 224 can be filled with a thermally conductive media (e.g., silicone rubber) to facilitate heat exchange between coolant and the soils surrounding the pile. The hole can be sealed and the coolant tubing 208, 218 can be attached to a supply port and a return port of a chiller system. The chiller system can be filled with coolant, or other fluid. In an aspect, the coolant can be glycol-based. The chiller system can be connected to a power source such as a solar power source, a conventional power source, and the like. The performance of the converted system can be monitored.

Figure 3:
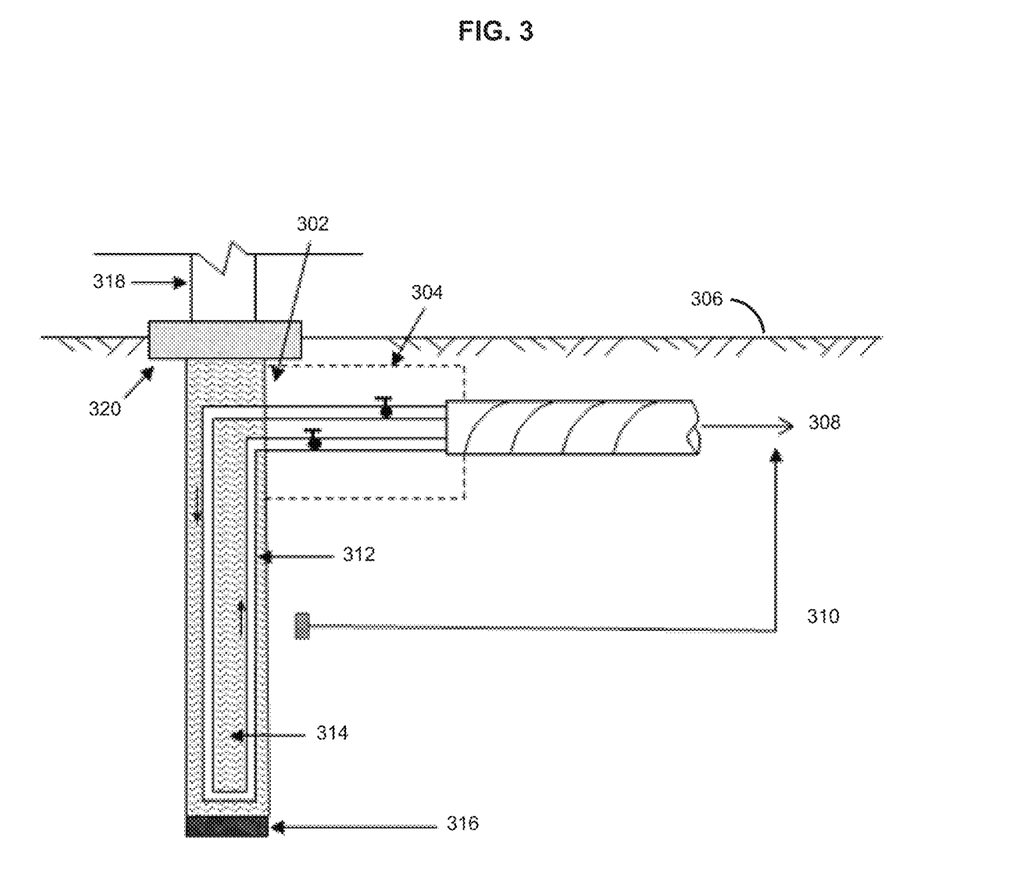
FIG. 3 illustrates conversion of a traditional steel pipe pile or thermal pile foundation into a closed loop cooling system having a foundation with active hydronic cooling capability.

FIG. 3 illustrates a method using new or existing infrastructure for active ground cooling. A closed loop piping system can be installed within the existing infrastructure, with a conductive media placed within the annulus of the device to promote heat transfer. This arrangement provides secondary containment for the working fluid in environments that benefit from such precaution.

In an aspect, a conversion of an existing pipe pile foundation 302 into a foundation with active hydronic cooling capability. In an aspect, the pipe pile foundation 302 can be new. In an aspect, the pipe pile foundation 302 can comprise steel. The pipe pile foundation 302 can be fitted with a closed loop active cooling system. In an aspect, a column 318 connected with the pipe pile foundation 302 can protrude from a ground surface 306. In an aspect, a cap 320 can be placed between the column 318 and the pipe pile foundation 302. In an aspect, the cap 320 can be custom fabricated. In an aspect, the cap 320 can be steel. Fluid in the existing pipe can be discharged. The pipe can be cut to a predetermined height. In an aspect, the pipe pile foundation 302 can comprise a passive ground cooling system. The cap 320 can be installed to the remaining portion of the passive ground cooling system. In an aspect, the pipe pile foundation can comprise removable insulation 304. In an aspect, a new tubing 312 can be inserted into the pipe. In an aspect, the new tubing 312 can extend to an end 316. In an aspect, the end 316 can be a soil plug. In an aspect, the end can be a pile tip. A thermally conductive media (e.g., gel, silicone rubber, etc.) 314 can be placed within the exiting pipe to promote heat transfer between the coolant and the soils surrounding the pile. The remaining portion of the pipe can be sealed. One or more coolant lines can be attached to a supply port and a return port 308 of a chiller system. In an aspect, the chiller system can be a glycol chiller system. In an aspect, a temperature sensor 310 can provide a temperature to the chiller system. In an aspect, the chiller system can alter the temperature based on feedback from the temperature sensor 310. In an aspect, the tubing 312 can provide first containment for the coolant. In an aspect, the thermally conductive media 314 can provide secondary containment for the coolant. In an aspect, the pipe pile foundation 302 can provide third containment for the coolant.

Figure 4:
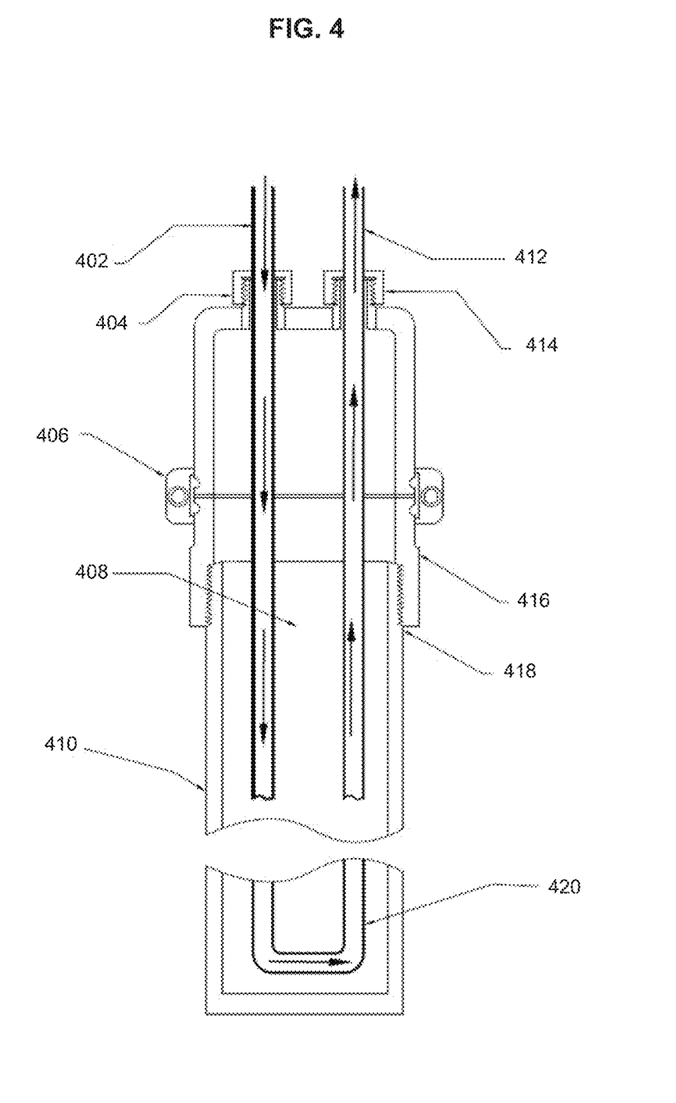
FIG. 4 illustrates a custom fitting to form a closed low-pressure coolant contained within thermal gel for the converted closed loop cooling system of FIG. 3.

FIG. 4 illustrates a custom fitting to form a closed low-pressure coolant circulation system. In an aspect, a condensing portion of an existing passive cooling system can be removed from an existing passive cooling pipe 410. Threads 418 can then be grooved into an existing thermosyphon body of the pipe 410. In an aspect, a threaded base 416 can be fastened to the existing thermosyphon body of the existing pipe 410. In an aspect, fastening can comprise a rigid grooved seal and coupling 406. The threaded portion of the remaining thermosyphon body can be fitted with a custom fabricated cap. In an aspect, a closed active cooling loop can be created by extending tubing 420 to a bottom of a pipe body and return the tubing 420 through the cap. In an aspect, a thermally conductive media 408 (e.g., silicone rubber, etc.) can be placed within the existing pipe to promote heat transfer between the coolant and soil surrounding the existing pipe. One or more coolant lines can be attached to a supply port 402 and a return port 412 of a chiller system. In an aspect, a portion of the tubing 420 extending to the supply port 402 can be secured by compression fitting 404. In an aspect, a portion of the tubing 420 extending to the return port 412 can be secured by compression fitting 414. In an aspect, the tubing 420 can provide first containment for the coolant. In an aspect, the thermally conductive media 408 can provide secondary containment for the coolant. In an aspect, the pipe 410 can provide third containment for the coolant.

Figure 5:
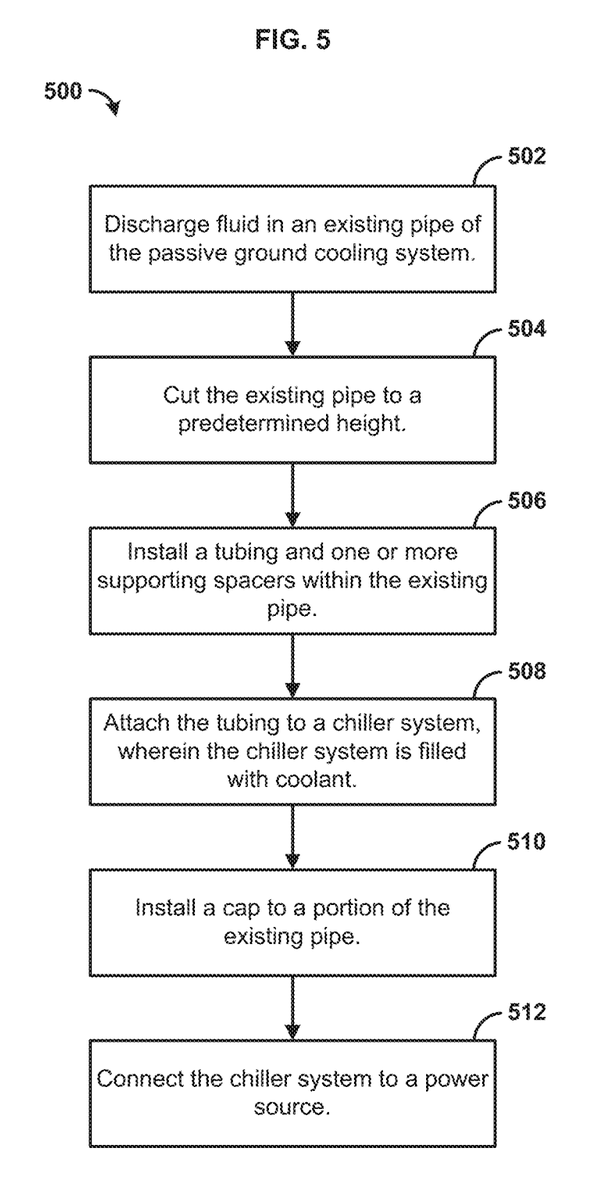
FIG. 5 illustrates a flow diagram of an exemplary method.

Turning to FIG. 5, a flow diagram of an exemplary method of converting a passive ground cooling system to an active ground cooling system 500 is illustrated. At step 502, fluid in an existing pipe of the passive ground cooling system can be discharged (e.g., released, emptied, ejected, drained, etc.). In an aspect, the fluid can be the fluid used by the passive ground cooling system. In an aspect, the existing pipe can be a thermosyphon pipe.

At step 504, the existing pipe can be cut to a predetermined height. In an aspect, the predetermined height can be based onsite specific conditions. In an aspect, the onsite specific conditions can comprise field equipment operation requirements, a condition of the existing pipe, etc. In an aspect, the onsite specific conditions can comprise a condition (e.g., firmness, moisture, etc.) of surrounding soil. In an aspect, the onsite specific conditions can comprise a condition (e.g., traffic, etc.) of a location an existing infrastructure. For example, if the location of the existing infrastructure comprises heavy traffic, the predetermined height of the existing pipe can be below grade, so that the pipe does not impede traffic.

At step 506, a tubing can be installed within the existing pipe. In an aspect, the tubing can be pex tubing. In an aspect, one or more supporting spacers can be used to install the tubing within the existing pipe. In an aspect, the supporting spacers can be used to center the tubing within the existing pipe. In an aspect, the supporting spacers can be spider spacers. In an aspect, the supporting spacers can comprise plastic. In an aspect, spacing of the supporting spacers can vary depending on pipe diameter and configuration (e.g., straight pipe, pipe with one or more bends that would restrict inserting spiders, etc.).

At step 508, the tubing can be attached to a chiller system. In an aspect, the chiller system can be filled with coolant. In an aspect, the coolant can be glycol-based. In an aspect, the coolant can be any working fluid.

At step 510, a cap can be installed to a portion of the existing pipe. In an aspect, the cap can be custom fabricated. In an aspect, the portion of the existing pipe can be threaded. In a further aspect, the cap can be fitted to the threaded portion of the existing pipe.

At step 512, the chiller system can be connected to a power source. In an aspect, the power source can comprise a solar power source. In an aspect, the power source can comprise a conventional power source.

Optionally, the inside of the existing pipe can be cleaned. Optionally, a layer can be coated on the inside of the existing pipe. In an aspect, the layer can be a corrosive prevention layer. In an aspect, the layer can be a sealant layer. Optionally, the existing pipe can be filled with a thermally conductive media. In an aspect, the thermally conductive media can be a gel. In an aspect, the thermally conductive media can be silicone rubber.

Figure 6:
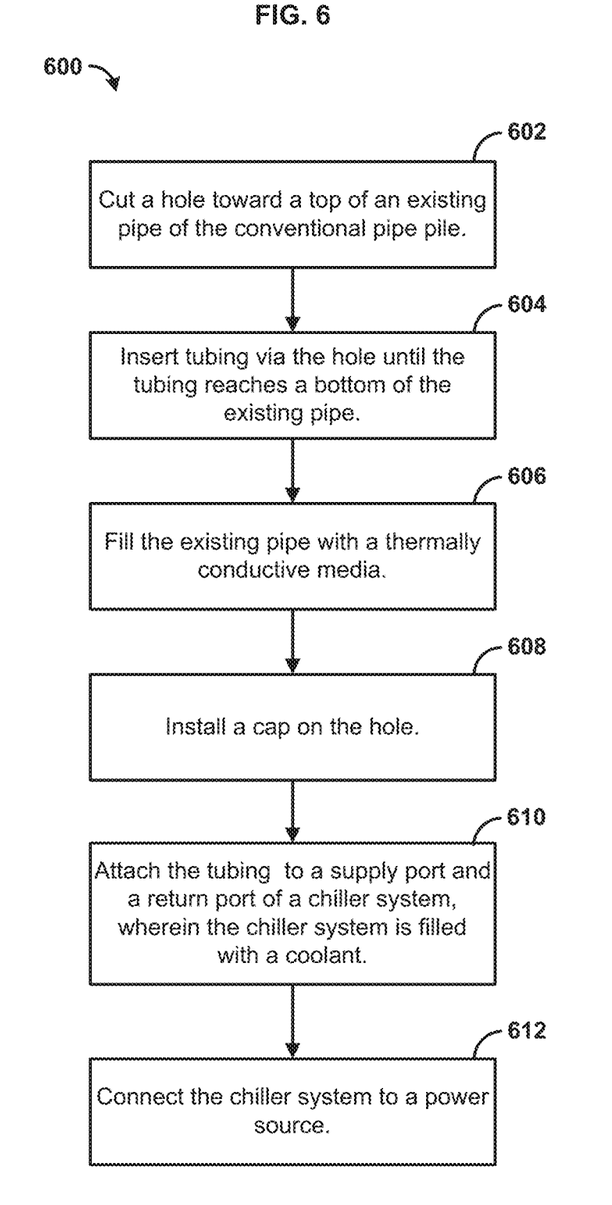
FIG. 6 illustrates a flow diagram of an exemplary method.

Turning to FIG. 6, a flow diagram of an exemplary method for converting a conventional pipe pile to an active ground cooling system 600 is illustrated. At step 602, a hole can be cut toward a top of an existing pipe of the conventional pipe pile. Optionally, fluid in the existing pipe can be discharged (e.g., released, emptied, ejected, drained, etc.). In an aspect, the fluid can be the fluid used by the conventional pipe pile. In an aspect, the existing pipe can be a thermosyphon pipe.

At step 604, tubing can be inserted via the hole until the tubing reaches a bottom of the existing pipe. In an aspect, the tithing can comprise a coolant loop.

At step 606, the existing pipe can be filled with a thermally conductive media. In an aspect, the thermally conductive media can be a gel. In an aspect, the thermally conductive media can be silicone rubber.

At step 608, a cap can be installed on the hole. In an aspect, the cap can be custom fabricated.

At step 610, the tubing can be attached to a supply port. In an aspect, the tubing can be attached to a return port of a chiller system. In an aspect, the chiller system can be filled with a coolant. In an aspect, the coolant can be glycol-based. In an aspect, the coolant can be any working fluid.

At step 612, the chiller system can be connected to a power source. In an aspect, the power source can comprise a solar power source. In an aspect, the power source can comprise a conventional power source.

Optionally, the inside of the existing pipe can be cleaned. Optionally, a layer can be coated on the inside of the existing pipe. In an aspect, the layer can be a corrosive prevention layer. In an aspect, the layer can be a sealant layer. Optionally, the existing pipe can be filled with a thermally conductive media. In an aspect, the thermally conductive media can be a gel. In an aspect, the thermally conductive media can be silicone rubber.

In an aspect, the converted cooling system can utilize any electricity source, allowing for flexibility on when energy can be input to the foundation system. Using any available power source, the converted cooling system can be able to provide cooling capacity year round to building or other structure foundations such as heated buildings with a slab on grade foundation system that emit heat to the subsurface soils.

Additional benefit can be realized when the condenser section from the passive cooling system is removed. For example, the condenser sections are mounted above grade and can be an obstacle to traffic and exposed to potential damage. The conversion process can allow for a flush mount or even below grade installation, thus minimizing the damage potential and obtrusiveness.

In an aspect, coolant temperature can be maintained by a chiller system, which cools and circulates the coolant. In converting to an active cooling system, cooling cycles can be controlled by a system algorithm. The difference between this active ground cooling system and a traditional passive cooling system lies in that the active system is designed to operate during periods of high solar radiation, while a passive system only works during winter months when the air temperature is lower than the ground temperature.

The converted system can provide cooling to the subsurface permafrost prior to and/or during the periods when foundation degradation would normally occur. The converted system can prevent permafrost degradation in the vicinity of the foundation of interest in a proactive manner. The energy requirements of the system can be kept to a minimum by preventing the phase change of the moisture within the soil via using renewable energy or conventional energy sources.

The converted passive to active ground cooling system can be an improvement over existing passive cooling technologies in several aspects. In an aspect, the converted ground cooling system can have a higher cooling capacity. In another aspect, the converted system can utilize existing foundation infrastructure. The converted cooling system can function during periods when foundation stability issues generally occur and have the ability to control the rate of energy input. The converted cooling system can operate year round if necessary.

This converted active cooling system can provide both short-term and long-term stability for foundations in permafrost sites, and enable operational flexibility to compensate for environmental variability due to climate change or other detrimental forces as needed. The active ground cooling system can be intended to either complement an existing foundation cooling system if additional cooling capacity is needed, or serve as a design alternative for new construction.

Conversion to an active hydronic ground cooling system can provide control of the rate and time of energy input to the foundation system. Heat can be extracted from the foundation when ambient temperatures call for foundation cooling. The converted system can shift cooling processes from winter to the summer season when foundation cooling is needed due to the increase of insulation and ambient air temperature. The increased solar flux provides an energy source that is sufficient to maintain the subsurface soils in a frozen state. By using a solar driven active cooling system, stability and predictability are provided to permafrost foundations and other saturated frozen soils in arctic, sub-arctic or high elevation regions.

The system has been described above as comprised of units. One skilled in the art will appreciate that this is a functional description and that the respective functions can be performed by software, hardware, or a combination of software and hardware. A unit can be software, hardware, or a combination of software and hardware.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An active ground cooling system comprising:
    an existing pipe of a passive ground cooling system, wherein fluid in the existing pipe has been discharged and wherein the existing pipe has been cut to a predetermined height and situated adjacent to or within permafrost soil;
    a temperature sensor situated within the permafrost soil;
    a chiller system configured to chill a coolant to a temperature that is less than a current ambient temperature based on feedback received from the temperature sensor indicative of a current permafrost soil temperature, wherein the chiller system is configured to cause the coolant to circulate throughout the existing pipe, and wherein the current ambient temperature is greater than the current permafrost soil temperature;
    a coolant pipe forming a coolant loop associated with the chiller system;
    a cap integrated with the existing pipe, wherein the cap defines an inlet opening sized to receive the coolant pipe and an outlet opening sized to receive the coolant pipe, and wherein the coolant pipe extends through the cap and wherein the coolant pipe extends through over half of the existing pipe toward a closed end of the existing pipe; and
    a power source connected to the chiller system.

2. The active ground cooling system of claim 1, wherein the power source comprises a solar power source.

3. The active ground cooling system of claim 1, wherein the existing pipe is filled with a thermally conductive medium.

4. The active ground cooling system of claim 3, wherein the thermally conductive medium comprises silicone rubber.

5. The active ground cooling system of claim 1, wherein the chiller system is in communication with the temperature sensor.

6. The active ground cooling system of claim 1, wherein the chiller system is further configured to receive the feedback from the temperature sensor.

7. The active ground cooling system of claim 1, further comprising insulation affixed to an outer side of the existing pipe.

8. The active ground cooling system of claim 7, wherein the insulation is removable insulation.

9. The active ground cooling system of claim 1, wherein the existing pipe comprises an inner surface, and wherein the inner surface is coated with a layer.

10. The active ground cooling system of claim 9, wherein the layer is a corrosion prevention layer or a sealant layer.

11. The active ground cooling system of claim 1, wherein the existing pipe is a thermosyphon pipe.

12. The active ground cooling system of claim 1, further comprising: a spacer between the cap and the coolant pipe configured to separate the cap and the coolant pipe.

* * * * *